(12) United States Patent
Bennett

(10) Patent No.: US 11,052,850 B1
(45) Date of Patent: Jul. 6, 2021

(54) UNDERRIDE GUARD

(71) Applicant: UTILITY TRAILER MANUFACTURING COMPANY, City of Industry, CA (US)

(72) Inventor: Jeffrey J. Bennett, South Pasadena, CA (US)

(73) Assignee: Utility Trailer Manufacturing Company, City of Industry, CA (US)

( * ) Notice: Subject to any disclaimer, the term of this patent is extended or adjusted under 35 U.S.C. 154(b) by 33 days.

(21) Appl. No.: 16/712,807

(22) Filed: Dec. 12, 2019

(51) Int. Cl.
  *B60R 19/56* (2006.01)
(52) U.S. Cl.
  CPC .................... *B60R 19/56* (2013.01)
(58) Field of Classification Search
  CPC ......... B60R 19/56; B60R 19/02; B60R 19/34; B60R 19/04
  USPC ....................................................... 293/102
  See application file for complete search history.

(56) References Cited

U.S. PATENT DOCUMENTS

| | | | | |
|---|---|---|---|---|
| 5,462,325 | A * | 10/1995 | Masuda | B60R 19/18 293/102 |
| 2002/0047281 | A1 * | 4/2002 | Hartel | B60R 19/18 293/102 |
| 2003/0218343 | A1 * | 11/2003 | Sato | B60R 19/24 293/155 |
| 2004/0032133 | A1 * | 2/2004 | Bird | B60R 19/14 293/154 |
| 2006/0028032 | A1 * | 2/2006 | Henseleit | B60R 19/18 293/102 |
| 2015/0076846 | A1 * | 3/2015 | Musale | B60R 19/56 293/133 |
| 2016/0304043 | A1 * | 10/2016 | Williams | B60R 19/18 |

FOREIGN PATENT DOCUMENTS

| | | | | |
|---|---|---|---|---|
| JP | H106892 | A * | 1/1998 | |
| JP | H1016681 | A * | 1/1998 | |
| JP | 2011126399 | A * | 6/2011 | |
| KR | 20170062029 | A * | 6/2017 | |
| WO | WO-2013005465 | A1 * | 1/2013 | ............. B60R 19/56 |
| WO | WO-2015080086 | A1 * | 6/2015 | ............. B60R 19/56 |

* cited by examiner

*Primary Examiner* — Jason S Morrow
*Assistant Examiner* — Kevin P Weldon

(57) ABSTRACT

Vertical brackets extend downwardly from a trailer or semi-trailer frame to a transverse tubular bar to form an underride guard. The transverse tubular bar includes a top, a bottom, a rear impact side and a forward side and extends beyond the vertical brackets to define two end portions. The top and bottom have slits therethrough on the outer half of the end portions extending from inwardly of the rear impact side toward the forward side at an angle toward the vertical brackets. The slits extend toward the vertical brackets at an angle at least 45° through a portion of their length and parallel to the longitudinal axis of the vehicle through a second portion. The forward side includes two converging surfaces from the top and bottom. The slits extend from the top and bottom no more than half way to the convergence of the two surfaces.

9 Claims, 1 Drawing Sheet

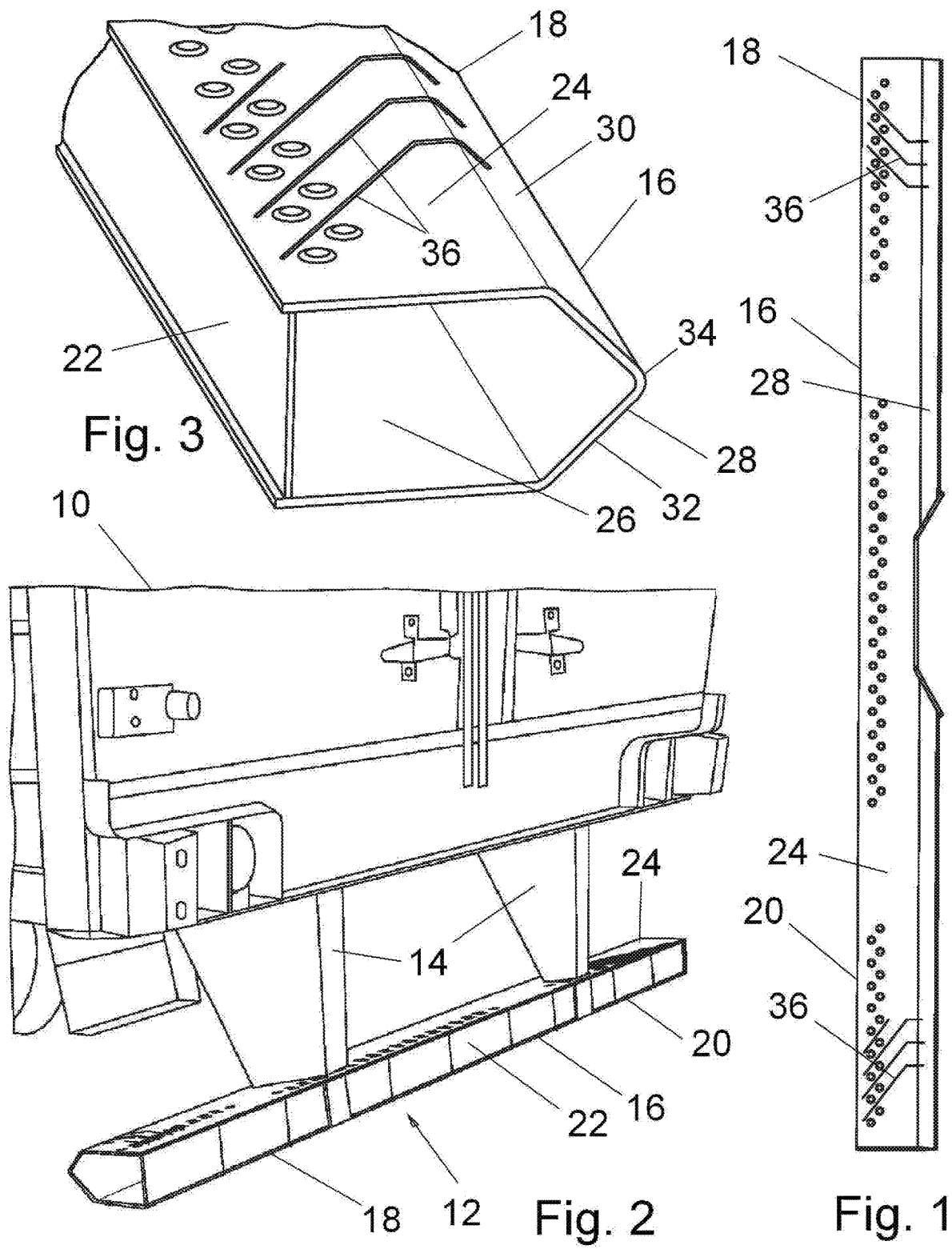

UNDERRIDE GUARD

BACKGROUND OF THE INVENTION

The field of the present invention is vehicle accident mitigation.

Rear Underrun Protection Systems known as underride guards are rigid assemblies at the rear of vehicles including trailers and semi-trailers. The Federal Department of Transportation has mandated these assemblies through NHTSA REGULATIONS FMVSS 223 and 224 with the intention that the bars will interfere with automobiles running under such high, heavy vehicles in a rear end collision. The object of the Federal Regulations is to reduce the likelihood of impact of the vehicle frame with the automobile passenger compartment. The rigid assemblies typically include vertical brackets depending from the vehicle to support a horizontal bar extending the width thereof. The length of the bars and ground clearance are dictated by the regulations to receive the structural areas of an automobile bumper and crumple zone.

SUMMARY OF THE INVENTION

The present invention is directed to an underride guard for vehicles including vertical brackets extending from the vehicle and a transverse bar attached thereto with two end portions extending beyond the vertical brackets. The bar is tubular with a top, a bottom and a rear impact side between the top and bottom. A weakened section at the end of each end portion has cuts through of the top and bottom extending forwardly from inwardly of the rear impact side. When the cuts are slits, they can be arranged to extend at an angle toward the vertical brackets.

Because the front bumper and structure of an automobile typically has a convex curve, the initial contact with the bar will be at its extreme end if the automobile is offset outwardly of the adjacent vertical bracket. The cuts reduce the magnitude of resisting force upon contact, spreading the energy through deformation of the bar. Further, the weakened end reduces the torque load of the impact at the adjacent vertical bracket. The more inelastic impact and the deformation of the bar can better capture the automobile. When angled slits are employed, the deformation tends to assume a shallow S-curve, increasing engagement with the automobile to reduce collateral damage.

Accordingly, it is an object of the present invention to provide an improved underride guard. Other and further objects and advantages will appear hereafter.

BRIEF DESCRIPTION OF THE DRAWINGS

FIG. 1 is an isometric view of an underride guard on a semi-trailer;

FIG. 2 is a plan view of the bar;

FIG. 3 is an isometric view of one end of the bar.

DETAILED DESCRIPTION OF THE PREFERRED EMBODIMENT

Turning to the figures, the rear end of a high vehicle 10 is illustrated in FIG. 1. This vehicle 10 may be an integral truck, trailer or semi-trailer having a structure above the front structural area of a typical automobile, including light duty trucks. The vehicle 10 includes an underride guard 12 perpendicular to the longitudinal axis of the vehicle and at the rear thereof. The underride guard 12 is to reduce the likelihood of an automobile driven into the back of the high vehicle 10 from continuing thereunder such that the passenger area of the automobile reaches the vehicle frame.

The underride guard 12 includes two vertical brackets 14 affixed to the frame of the vehicle 10 and depending downwardly therefrom. The vertical brackets 14 are spaced apart symmetrically from the centerline of the vehicle 10 and are either bolted or welded to the vehicle frame. A transverse tubular bar 16 is rigidly attached to the vertical brackets 14, also symmetrically of the vehicle centerline. To achieve a 96" bar length, the vertical brackets 14 are spaced apart 48" with 24" of bar 16 cantilevered at each end to form end portions 18, 20. DOT regulations dictate a maximum height of the bar 16 from the ground; and the bar 16 is to come within 4" of each side of the vehicle 10.

The tubular bar 16 of the preferred embodiment is fabricated from a plate defining a rear impact side 22 and a plate formed into a U-shape defining a top 24, a bottom 28 and a forward side 30. The rear impact side 18 is welded between the top 20 and the bottom 22 adjacent the edges thereof. The forward side 24 is defined by two converging surfaces 30, 32 meeting at a radiused convergence 34. The top includes holes with raised margins for traction. The tubular bars 16 may be one continuous device attached to the vertical brackets 14 or may be components welded to each side of the vertical brackets 14 to define a composite tubular bar 16.

The Federal Regulations are also applied to prevent underride during an impact where the vehicle is misaligned with 30% of an automobile's front bumper overlapping the underride bar 16. This is intended to miss the nearest vertical bracket 14. In this test, the curved front of the automobile first impacts the extreme end of the bar 16 resulting in maximum leverage on the end portion 18, 20 at the adjacent bracket 14 with a rigid bar 16. Reducing this highest stress is advantageous.

If an automobile hits a rigid bar 16 outwardly of the vertical brackets with the centerline of the automobile being outwardly of the bar, the rigid bar 16 has a best possibility of failing at the adjacent vertical bracket 14 at maximum leverage. The failed end portion 18, 20 then can allow the automobile to continue under the vehicle. The same failure can occur by backing a loaded trailer into a dock, a berm, or the ground at an angle, damaging not only the rigid bar but the mounting brackets and even the body of the trailer.

To avoid the foregoing disadvantages of a rigid bar, the bar 16 includes cuts 36 through the bar 16 on a section which is no more than the outer half of each end portion 18, 20. The cuts 36 are arranged to reduce the strength of the bar 16 in a zone of first impact with the bar ultimately providing the full strength required. The reduction in strength at impact reduces the extreme torque load on the end portions 18, 20 at the vertical brackets 14 upon initial impact. The cuts 36 may be holes of various shapes including slits, all to weaken the outer section of the bar 16. This section is preferably weakened enough that the torque load at the adjacent vertical bracket 14 is no greater during impact than if the initial impact occurred just inwardly of the weakened section.

If slits 36 are used, the slits 36 extend on the top 24 and bottom 26 of the bar 16 from just inwardly of the rear impact side 22 toward the forward side 28. The slits 36 may conveniently be cut using a laser or plasma cutting tool. The slits 36 can vary from as little as 0.03" to 0.135" depending on the diameter of the cutting tool used.

In the preferred embodiment, the slits 36 extending across the top 24 and bottom 26 also extend across no more than half of the converging surfaces 30, 32 toward the radiused convergence 34. The slits 36 also are at an angle of at least 45° from the vehicle longitudinal axis for a first distance as they extend from the rear impact side 28 to resist shear in the direction of impact. Approximately 53° has been used inclined toward the adjacent vertical bracket 14 in the preferred embodiment. The slits 36 then extend parallel to the vertical brackets 14 through a second distance including through the converging surfaces 30, 32.

The strain on the end portion 18, 20 with the weakened section has been found to result in a more energy absorbing inelastic impact and the bar 16 assuming a shallow S-curve, providing continuing contact to restrain the impinging automobile. By having the slits 36 only on the outer half of each end portion 18, 20, the weak section is limited; and the inner half of each end portion 18, 20 retains the full strength of the bar 16 where the force of impact acts at the adjacent vertical bracket 14 through a reduced moment arm to continue to arrest the vehicle.

Thus, an improved underride guard for vehicles has been described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An underride guard for a vehicle having a longitudinal axis, comprising
    vertical brackets extending downwardly from the vehicle;
    a transverse tubular bar on the vertical brackets including a top, a bottom, a rear impact side and a forward side, the transverse tubular bar extending beyond the vertical brackets to define two end portions, each end portion having a weak section defined by the top and bottom having cuts therethrough, the cuts therethrough being slits extending on the bar from inwardly of the rear impact side toward the forward side at angles to the longitudinal axis of the vehicle.

2. The underride guard of claim 1, the weak sections being no more than an outer half of each of the end portions.

3. The underride guard of claim 1, the angles being inclined in the direction of the vertical brackets in the extension of the slits toward the forward side.

4. The underride guard of claim 1, the angles being at least 45° to the longitudinal axis of the vehicle.

5. The underride guard of claim 1, the slits extending on the weak section from inwardly of the rear impact side for a first distance at the angles to the longitudinal axis and parallel to the longitudinal axis for a second distance.

6. The underride guard of claim 5, the forward side including two converging surfaces from the top and the bottom to a convergence, the slits extending for the second distance from the top and the bottom no more than half way to the convergence of the two surfaces in the second distance.

7. An underride guard for a vehicle having a longitudinal axis, comprising
    vertical brackets extending downwardly from the vehicle;
    a transverse tubular bar on the vertical brackets including a top, a bottom, a rear impact side and a forward side, the transverse tubular bar extending beyond the vertical brackets to define two end portions, each end portion having a weak section defined by the top and bottom having slits therethrough extending on the bar from inwardly of the rear impact side toward the forward side at angles to the longitudinal axis of the vehicle, the angles being toward the vertical brackets in the extension of the slits toward the forward side, the weak sections being no more than an outer half of each of the end portions.

8. The underride guard of claim 7, the forward side including two converging surfaces from the top and the bottom extending to a convergence, the slits extending on the weak section from inwardly of the rear impact side at the angles inclined toward the vertical brackets being for a first distance and being parallel to the longitudinal axis for a second distance, the slits extending for the second distance from the top and the bottom no more than half way to the convergence of the two surfaces in the second distance.

9. The underride guard of claim 7, the angles in the first distance being at least 45° to the longitudinal axis of the vehicle.

* * * * *